US009075080B2

(12) United States Patent
Mosley et al.

(10) Patent No.: US 9,075,080 B2
(45) Date of Patent: Jul. 7, 2015

(54) METHOD AND APPARATUS FOR ADAPTIVE TRACKING USING A SCANNING PROBE MICROSCOPE

(71) Applicant: Bruker Nano, Inc., Santa Barbara, CA (US)

(72) Inventors: Judith Mosley, Santa Barbara, CA (US); Johannes Kindt, Ettlingen (DE)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/211,484

(22) Filed: Mar. 14, 2014

(65) Prior Publication Data

US 2014/0283227 A1    Sep. 18, 2014

Related U.S. Application Data

(60) Provisional application No. 61/793,976, filed on Mar. 15, 2013.

(51) Int. Cl.
*G01Q 10/00* (2010.01)
*G01Q 10/06* (2010.01)
*B82Y 35/00* (2011.01)
*G01Q 30/04* (2010.01)

(52) U.S. Cl.
CPC ............... *G01Q 10/06* (2013.01); *B82Y 35/00* (2013.01); *G01Q 30/04* (2013.01)

(58) Field of Classification Search
USPC .................................................. 850/1, 2, 3
See application file for complete search history.

(56) References Cited

U.S. PATENT DOCUMENTS

| 6,028,305 | A | 2/2000 | Minne et al. |
| 6,178,653 | B1* | 1/2001 | Griffith et al. ................ 33/555 |
| 7,164,127 | B2 | 1/2007 | Nakagaki et al. |
| 7,865,966 | B2 | 1/2011 | Su et al. |
| 7,940,998 | B2 | 5/2011 | Doerrer |
| 2007/0272005 | A1 | 11/2007 | Abe et al. |
| 2008/0308718 | A1 | 12/2008 | Kollin |
| 2011/0167524 | A1 | 7/2011 | Hu et al. |

FOREIGN PATENT DOCUMENTS

JP    2007236606 A    9/2007

OTHER PUBLICATIONS

Written Opinion of the International Search Authority Dated Jul. 25, 2014 for PCT/US2014/027809.

* cited by examiner

*Primary Examiner* — Kiet T Nguyen
(74) *Attorney, Agent, or Firm* — Boyle Fredrickson, S.C.

(57) ABSTRACT

Methods and apparatuses are described for adaptively tracking a feature of a sample using a scanning probe microscope. The adaptive technique provides an adaptive method for tracking the feature scan-to-scan despite actual or apparent changes in feature shape due, for example, to an evolving/transitioning state of the sample, and/or actual or apparent changing position due, for example, to movement of the sample and/or drift of the piezoelectric tube actuator. In a preferred embodiment, each scan may be processed line-by-line, or subpart-by-subpart, and may be analyzed either in real time or off-line. This processing technique improves speed, processing, reaction, and display times.

23 Claims, 9 Drawing Sheets

METHOD AND APPARATUS FOR ADAPTIVE TRACKING USING A SCANNING PROBE MICROSCOPE

CROSS REFERENCE TO A RELATED APPLICATION

This application claims the benefit of the filing date of U.S. Provisional Patent Application Ser. No. 61/793,976, filed Mar. 15, 2013 and entitled Method and Apparatus for Adaptive Tracking Using a Scanning Probe Microscope the subject matter of which is hereby incorporated by reference in its entirety.

BACKGROUND OF THE INVENTION

The present invention is directed to scanning probe microscopes, and more particularly, to a method and apparatus for adaptively tracking one or more features(s) of a sample during successive SPM scans.

Scanning probe microscopes ("SPM's"), such as the atomic force microscope ("AFM"), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding image of the sample can be generated.

Figure 1:
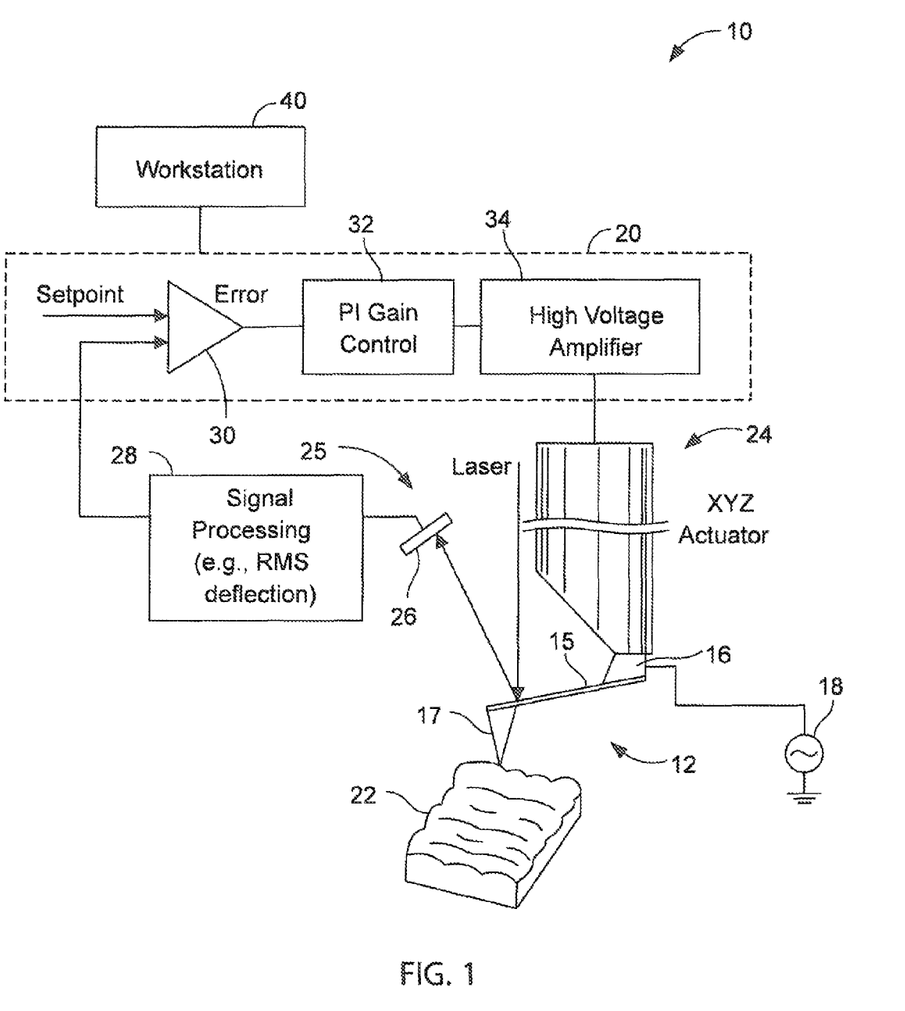
FIG. 1 is a block diagram of an atomic force microscope configured to perform an adaptive feature tracking procedure in accordance with an embodiment of the present invention.

A typical AFM system is shown schematically in FIG. 1. An AFM 10 employs a probe device including a probe 12 having a cantilever 15 and tip mounted or formed on or near the free end of the cantilever. A scanner 24 generates relative motion between the probe 12 and a sample 22 while the probe-sample interaction is measured. In this way, images or other measurements of the sample can be obtained. Scanner 24 is typically comprised of one or more actuators that usually generate motion in three mutually orthogonal directions (X, Y, Z). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Scanner 24 often comprises a piezoelectric stack (often referred to herein as a "piezo stack") such as a piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Most typically, an actuator assembly is provided in the form of an XY-actuator that drives the probe or sample in a horizontal, or XY-plane and a Z-actuator that moves the probe or sample in a vertical or Z-direction.

In a common configuration, probe 17 is coupled to an oscillating actuator or drive 16 that is used to drive probe 12 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 12 to oscillate. The probe-sample interaction is typically controlled via feedback by controller 20. The actuator 16 may be coupled to the scanner 24 and probe 12 but may be formed integrally with the cantilever 15 of probe 12 as part of a self-actuated cantilever/probe.

The probe 12 may be oscillated and brought into contact with sample 22 as sample characteristics are monitored by detecting changes in one or more characteristics of the oscillation of probe 12, as described above. In this regard, a deflection detection apparatus 25 is typically employed to direct a beam towards the backside of probe 12, the beam then being reflected towards a detector 26, such as a four quadrant photodetector. The deflection detector is often an optical lever system such as described in Hansma et al, U.S. Pat. No RE 34,489, but may be some other deflection detector such as strain gauges, capacitance sensors, etc. The sensing light source of apparatus 25 is typically a laser, often a visible or infrared laser diode. The sensing light beam generated by the sensing light source can also be generated by other light sources, for example a He—Ne or other laser source, a superluminescent diode (SLD), an LED, an optical fiber, or any other light source that can be focused to a small spot. As the beam translates across detector 26, appropriate signals are processed by a signal processing block 28 (e.g., to determine the RMS deflection of probe 12). The interaction signal (e.g., deflection) is then transmitted to controller 20, which processes the signals to determine changes in the oscillation of probe 12. In general, controller 20 determines an error at Block 30, then generates control signals (e.g., using a P1 gain control Block 32) to maintain a relatively constant interaction between the tip and sample (or deflection of the lever 15), typically to maintain a setpoint characteristic of the oscillation of probe 12. The control signals are typically amplified by a high voltage amplifier 34 prior to, for example, driving scanner 24. For example, controller 20 is often used to maintain the oscillation amplitude at a setpoint value, $A_S$, to insure a generally constant force between the tip and sample. Alternatively, a setpoint phase or frequency may be used. Controller 20 is also referred to generally as feedback where the control effort is to maintain a constant target value defined by setpoint.

A workstation 40 is also provided, in the controller 20 and/or in a separate controller or system of connected or stand-alone controllers located on-board or off-board the AFM, that receives the collected data directly or indirectly from the controller and that manipulates the data obtained during scanning to perform data manipulation operating such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including but not limited to a computer RAM, hard disk, network storage, a flash drive, or a CD ROM.

AFMs may be designed to operate in a variety of modes, including contact mode and oscillating mode. Operation involves moving the sample and/or the probe assembly up and down relatively perpendicular to the surface of the sample in response to a deflection of the cantilever of the probe assembly as it is scanned across the surface. As discussed briefly above, scanning typically occurs in an "X-Y" plane that is at least generally parallel to the surface of the sample, and the vertical movement occurs in the "Z" direction that is perpendicular to the x-y plane. Note that many samples have roughness, curvature and tilt that deviate from a flat plane, hence justifying the use of the term "generally parallel." In this way, the data associated with this vertical motion can be stored and/or used to construct an image of the sample surface corresponding to the sample characteristic being measured, e.g., surface topography. In one practical mode of AFM operation, known as TappingMode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation (a controlled distance between the probe and sample). Alternative feedback arrangements keep the phase or oscillation frequency constant. As in contact mode, these feedback signals are then collected, stored and used as data to characterize the sample.

Regardless of their mode of operation, AFMs and other SPMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs and other SPMs are important measurement devices in many diverse fields ranging from semiconductor manufacturing to biological research.

A method of operating an SPM by identifying a feature of the sample from the sample surface data and automatically performing a zoom-in scan of the feature based on the identifying step is described in U.S. Pat. No. 7,868,966 to Su et al., hereby incorporated by reference in its entirety. As described in U.S. Pat. No. 7,868,966, the method operates to quickly identify and confirm the location of a feature contained in a region of interest so as to facilitate performing a directed high resolution image of the feature.

Current techniques for tracking features in successive scans typically rely on tracking fixed data patterns. That is, they assume that the feature contained in the region of interest will remain essentially unchanged, with respect to shape, size, orientation, and other attributes of the feature in each successive scan. Some systems attempt to compensate for thermal drift of actuators that cause small apparent movement or distortion of the feature from scan-to-scan. These systems, however, are incapable of "adaptively" tracking a feature if that feature displaces over time by changing feature attribute (s) within the scanned area. Accordingly, movement of such features on the sample, movement of the sample and/or drift of the actuator by amounts as little as ~0.10 nm per minute can lead to a failure to track the feature entirely over a series of scans. This failure can lead to severe image distortion and even failure to locate the feature in a given scan.

SUMMARY OF THE INVENTION

In accordance with an aspect of the invention, computer-implemented methods and apparatuses are provided for adaptively tracking a scanned feature of sample despite feature displacement due to changes in one or more attributes of the feature such as the size, shape, orientation, and/or location of the feature due, for example, to an evolving/transitioning state of the sample. A "feature" in this regard is an aspect of the sample that can be differentiated from neighboring portions of the sample. The methods and apparatuses also provide for adaptively tracking a feature despite apparent feature displacement due, for example, to movement of the sample and/or drift of the actuator.

In a preferred embodiment, each scan may be processed line-by-line, or subpart-by-subpart, with progressive updating and refinement of the feature displacement estimate, and may be analyzed in real time. This enables, for example, within-scan drift correction and feature tracking, in addition to improving processing speed, reaction times, and display times.

Specifically, one aspect of the present invention includes a method for adaptively tracking a feature contained in a region of interest while scanning a sample using a SPM. The adaptive tracking technique uses an adaptive template rather than a fixed template to track the region of interest. Each step may be performed in "real time", i.e., no later than at the beginning of the next scan and possibly more frequently than that. More specifically, a first scan containing a feature is captured using the SPM. A second scan at the same location is captured. A vector "displacement" of the feature between the first and second scans is determined, where "displacement" is an actual or apparent change in one or more of the location, size, orientation, and shape of the feature or some other SPM recognizable attribute of the feature between successive scans. The scanner may then be repositioned in dependence on the determined vector displacement to compensate for the determined displacement, and a third scan of the feature is captured. A vector displacement of the feature between the second and third scans is then determined, the scanner may then be repositioned in dependence on the determined vector displacement, and a fourth scan of the feature is captured. The process is then repeated for a number of additional scans in which the data from each $N^{th}$ scan, adjusted by a calculated inter-scan displacement between the $N^{th}$ scan and the $N^{th}-1^{st}$ scan, is used to determine a displacement of the feature in the $N^{th}+1^{st}$ scan.

Alternatively, all scans may be performed first, and the adaptive tracking calculations may be performed later. In this case, the scanner would not be repositioned in dependence on determined vector displacements between preceding scans. Nevertheless, the adaptive tracking technique can be used to facilitate digital image alignment, manipulation of common sample features across multiple scans, and/or understanding of physical processes occurring on the sample or associated with the AFM equipment It is thus a feature of at least one embodiment of the invention to adjust each of a third and subsequent scans of a feature based on determinations from the two immediately preceding scans. This determination may, for example, be made using normalized cross-correlation and/or any other feature matching technique known in the art or later developed. The normalized cross-correlation is a similarity metric used for area based feature matching: the higher the normalized correlation coefficient, the better (stronger) the feature match, and therefore the higher the confidence in the match.

Displacement of the feature may be determined on a line-by-line or other subpart-by-subpart basis. The method of calculating the line-by-line or subpart-by-subpart displacement uses an evolving (adapting) template in which the template may, for example, be the last line, shifted by the previously calculated displacement.

Also disclosed is a method of calculating the normalized cross-correlation in parallel with scanning, such that the correlation matrix is incrementally updated and refined as soon a scan line becomes available. As each line is scanned, all correlation matrix coefficients which depend on that line are updated. In an embodiment, continuously running accumulators, for example, may be used to update correlation matrix coefficients. In other words, correlation matrix rows may be progressively updated and can be analyzed as soon as each scan line is captured and processed.

It is thus a feature of at least one embodiment of the invention to provide optimized speed and response.

The feature may be kept "aligned" in substantially the same position in a displayed field of view in each successive scan.

It is also a feature of at least one embodiment of the invention to permit focusing and zooming of the feature within a smaller area with increased precision.

Also disclosed is an SPM capable of performing one or more of the operations described above.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 2:
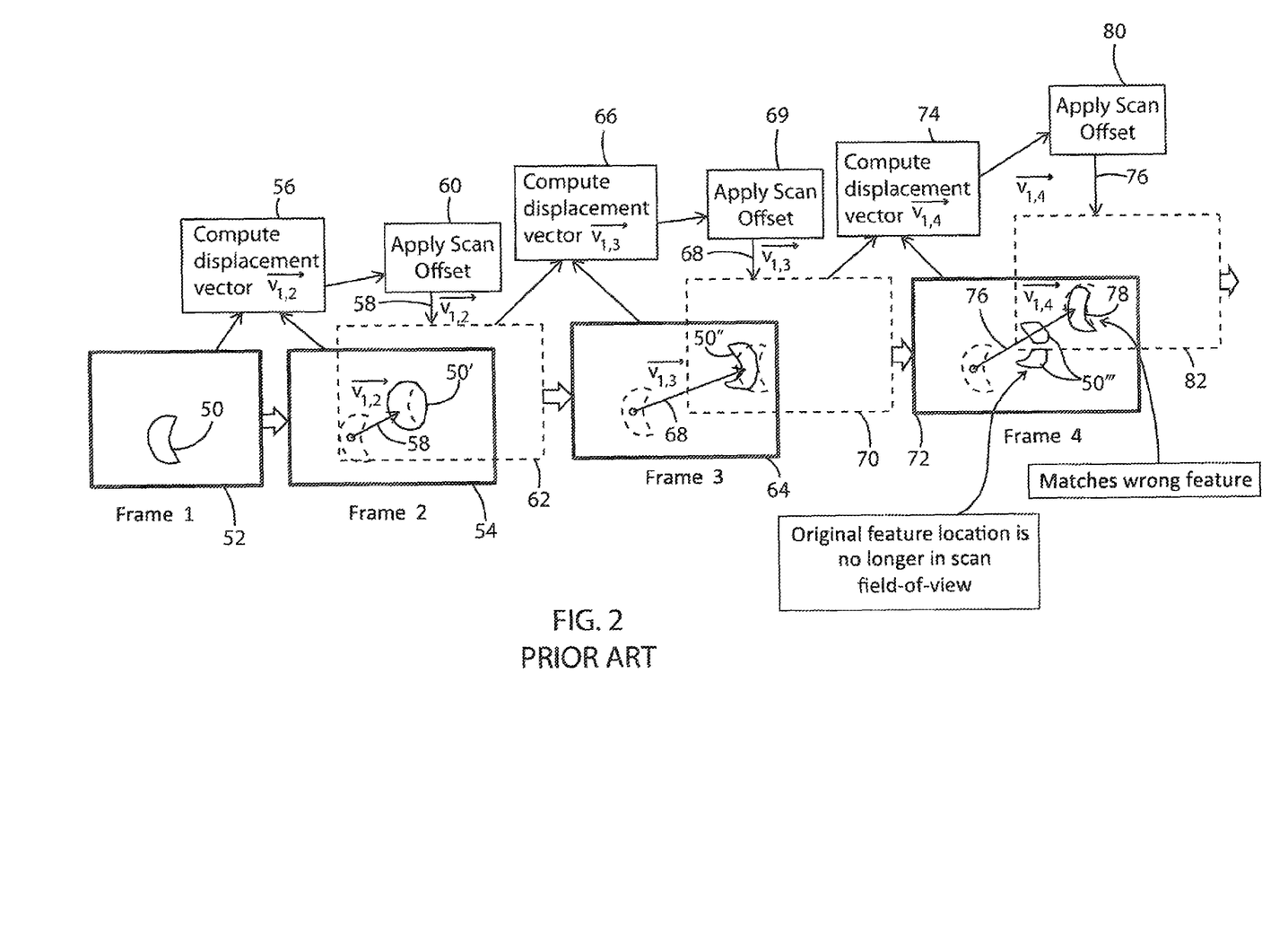
FIG. 2 is a diagram schematically illustrating a prior art, fixed template-based tracking of a feature contained in a sample, appropriately labeled "Prior Art"

Prior art feature tracking techniques relied on "fixed template" tracking in which the same invariable or "fixed" approach or "template" is used to track frame-to-frame displacement over successive scans. One such technique is illustrated in FIG. 2, which schematically illustrates fixed template-based tracking of a feature 50 contained in a region of interest ("ROI") in a sample. The feature may be a critical feature of special interest within the scanned area or "frame" or may be a larger portion or entire area of the sample surface within the frame. Hence, the ROI may be any portion or all of the frame. An SPM, which may be an AFM as described above in conjunction with FIG. 1, captures a first scan ("Frame 1") 52 of the feature 50. The feature 50 may be identified visually and/or by any other technique known in the art or later developed.

The SPM next captures a second successive scan ("Frame 2") 54. In the second scan 54, the feature 50 has displaced to become a modified feature 50' due, for example, to the evolving/transitioning state of the sample and/or actuator drift. To reiterate, a feature is "displaced" whenever its actual or apparent location, size, orientation, shape or another SPM recognizable attribute of the feature changes from scan-to-scan.

Next, in block 56, fixed template software and/or circuitry within the SPM operates to determine a first displacement vector 58 characterizing the direction and magnitude of displacement between the feature 50 and the modified feature 50'. The vector 58 is determined from the position of the feature 50 from the first scan 52, using a reference location such as the approximate center of the shape of the feature 50, to the position of the modified feature 50' in the second scan 54, also using the reference location. The displacement vector 58 may be determined, for example, by locating a peak of the correlation matrix surface In block 60, the fixed template software and/or circuitry operates to adjust the scan position 62 of the SPM scan for the next successive (third) scan as a function of the determined feature displacement between the first and second scans 52 and 54 according to the vector 58.

The SPM next captures a third successive scan ("Frame 3") 64. In the third scan 64, the modified feature 50' has displaced again to a modified feature 50", adjusted position 62 notwithstanding, due, for example, to the continually evolving/transitioning state of the sample and/or actuator drift.

Next, in block 66, the fixed template software and/or circuitry within the SPM operates to determine a second displacement vector 68 characterizing the direction and magnitude of displacement between the original feature 50 as imaged in the first scan, adjusted by vector 58, and the modified feature 50" as imaged in the third scan. The vector 68 is determined from the displacement of the original feature 50 from the first scan 52, adjusted by vector 58, to the position of the modified feature 50" in the third scan 64, also using the approximate center of the original feature 50 despite another change in shape, size, and/or orientation of the modified feature 50". An error has already been introduced in the calculation of vector 68, due to the use of the fixed template 50 which failed to account for changes in size, shape, and/or orientation of the feature.

In block 69, the fixed template software and/or circuitry compensates for the determined displacement by adjusting the scan position 70 of the scanner for the next successive scan as a function of the determined displacement of the feature 50 between the first scan 52, adjusted by vector 58, and third scan 64 according to the vector 68.

The SPM next captures a fourth successive scan ("Frame 4") 72. In the fourth scan 72, the modified feature 50" has displaced again to a modified feature 50''', adjusted scan position 70 notwithstanding, due, for example, to the continually evolving/transitioning state of the sample and/or actuator drift.

Next, in block 74, the fixed template software and/or circuitry operates to determine a third displacement vector 76 characterizing the direction and magnitude of displacement between the original feature 50 from the first scan 52, adjusted by vectors 58 and 68, and the modified feature 50'. However, due to substantial size, orientation and/or shape changes of the modified feature 50''' relative to the original feature, the fixed template software and/or circuitry fails to track the modified feature 50'''. Instead, the fixed template software and/or circuitry identifies and locks on a different, wrong feature 78. This failure is due to the fact that the vector 76 is determined from the original feature 50 from the first scan 52 and failed to account for changes in size, orientation, and/or shape of the feature. Hence, in block 80, the fixed template software and/or circuitry erroneously adjusts the scan position 82 of the scanner in the next successive scan according to the vector 76.

Consequently, due to the fixed template software and/or circuitry's inability to adapt to displacement of the feature due, for example, to the evolving/transitioning state of the sample, the modified feature 50''' begins to fall out of view in the scan position 82.

Figure 3:
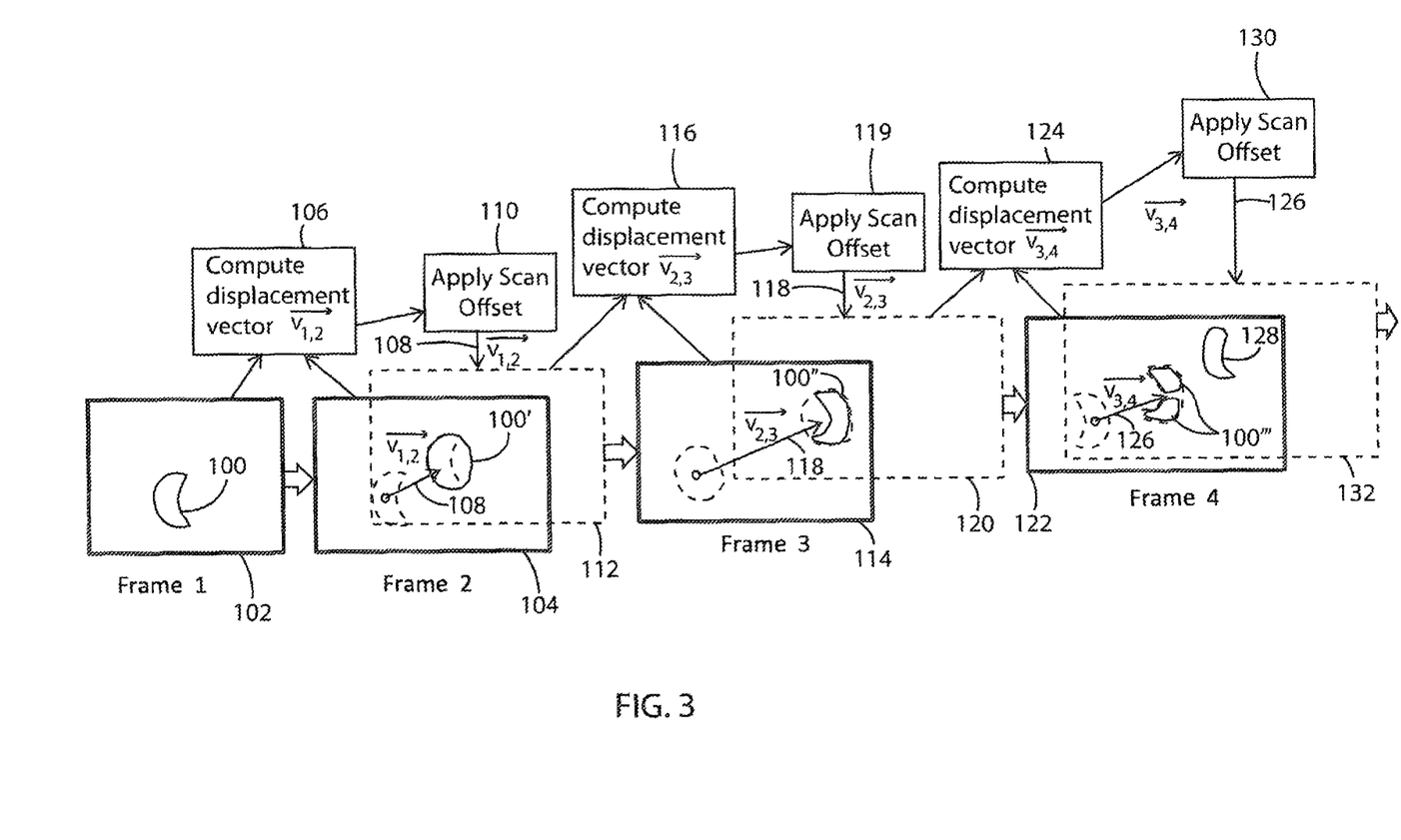
FIG. 3 is a diagram illustrating an adaptive technique for tracking a feature contained in a sample in accordance with an embodiment of the invention.

Referring now to FIG. 3, an adaptive tracking technique performed in accordance with an embodiment of the present invention avoids the problems associated with the technique described above with respect to FIG. 2. The adaptive tracking technique of FIG. 3 uses an adaptive template for tracking a "feature" 100 in sequentially acquired scans, despite changes in actual or apparent attributes of the feature. A "feature" in this regard is an aspect of a sample which, at any given point in time, is located at a specific location on the sample and that has at least one SPM recognizable "attribute" that permits the aspect to be differentiated from neighboring portions of the sample. The aspect may take the form of for example, a topographic attribute such as a recognizable area that is higher than the surrounding portions of the sample, an electrical attribute such as an area of relatively high capacitance, a magnetic characteristic such as an area that is relatively strongly magnetized, or some combination of these and/or other attributes. For example, a feature may be an area of a specific size or shape that is above a height "z". The boundaries of such a feature typically can be recognized by contrast variations, such as differences in height "DELTA z" between the points on the boundary and adjacent points. The feature may be selected manually by, for example, using a mouse to position a cursor over the feature and clicking on that feature. It also could be selected automatically using image recognition software. The adaptive tracking technique of this embodiment is able to track the feature frame-to-frame despite changes in the attribute, so long as the attribute does not change so rapidly that the feature is not recognizable frame-to-frame. In the example provided here, the adaptive tracking technique of this embodiment is able to track the feature frame-to-frame despite changes in the size and/or shape of the area having a height greater than "z", so long as that size/or shape does/do not change so rapidly that the feature is not recognizable frame-to-frame.

In one implementation, the feature 100 is contained in a region of interest "ROI." The ROI is a portion of the scanned area or "frame" that may be limited to the feature 100, if the feature 100 is a critical feature of special interest within the frame. Alternatively, the ROI may be a larger portion or entire area of the sample surface within the frame. Hence, the ROI may be any portion or all of the frame. The ROI may be selected using any existing or later developed technique. For example, in one particularly simple example, the ROI may be user-defined with input to the workstation 40 while viewing the scanned image by simply drawing an area of arbitrary size and shape in the scanned image around the feature 100 using a mouse, stylus, or any other suitable technique. In the simplest implementation in which the ROI is drawn using a mouse-activated cursor, the shape is a rectangle. The ROI may also be generated automatically, for example, using an algorithm that recognizes high contrast patterns and expands the ROI around it.

The technique can be performed using an SPM constructed as described above in FIG. 1, with the SPM being programmed to perform the adaptive tracking technique.

The calculations of the adaptive tracking technique are performed by a programmed computer which, in this embodiment, takes the form of workstation 40. To reiterate, the workstation may be provided in the controller 20 and/or in a separate controller or system of connected or stand-alone controllers located on-board or off-board the AFM. The workstation 40 may comprise software, firmware, hardwired circuitry, or any combinations thereof. The workstation 40 receives the collected data directly or indirectly from the AFM controller and manipulates the data obtained during scanning to perform data manipulation operations such as point selection, curve fitting, and distance determining operations as well as the adaptive tracking operations discussed herein. The workstation can store the resulting information in memory, use it for additional calculations, display it on a suitable monitor, and/or transmit it to another computer or device by wire or wirelessly. The memory may comprise any computer readable data storage medium, examples including but not limited to a computer RAM, a hard disk, network storage, a flash drive, the Cloud, or a CD ROM.

The SPM captures a first scan 102 of the feature 100, resulting in ("Frame 1"), and can display the feature in real time. The feature 100 is identified visually, and/or by any other known or later developed humanly implemented or computer implemented identification technique. Each scan may have an initial resolution on the order of 50 µm, and, by keeping the feature 100 in view, each scan may permit zooming of the feature 100 on the order of 1 µm.

The SPM next captures a second successive scan 104, resulting in ("Frame 2"), from which the feature may be tracked and displayed in real time. In the second scan 104, the feature 100 is displaced in multiple respects relative to Frame 1. It has changed in size, shape, and/or orientation to a modified feature 100 due, for example, to the evolving/transitioning state of the sample. In addition, the modified feature 100' has changed positions in the second scan 104 relative to the first scan 102 due, for example, to movement of the sample or at least the feature 100 and/or drift of the actuator.

Next, in block 106, adaptive feature tracking software and/or circuitry in the workstation 40 operates to determine a first displacement vector 108 characterizing the direction and magnitude of displacement between the feature 100 and the modified feature 100' between the first and second scans 102 and 104. The vector 108 is determined from the position of the feature 100 from the first scan 102, using the approximate center of the feature 100, or any other arbitrary but identifiable portion of the feature 100, to the position of the modified feature 100 in the second scan 104, also using the approximate center or other identifiable portion of the original feature 100. The displacement vector 108 may be determined, for example, by locating a peak of the correlation matrix surface and using a parabolic or Gaussian interpolation to compute sub-pixel displacement. The displacement vector 108 may be determined, for example, by locating a peak (maximum) of the correlation matrix surface. This peak corresponds to the displacement between scans 102 and 104 at which there is the highest confidence of having located the modified feature 100' in scan 104. Typically it is required that the peak correlation value exceeds a specified minimum value (threshold) in order to determine feature displacement, thereby providing acceptable confidence that the feature match is valid. This threshold might depend, for example, on the noise level of the image: the required correlation threshold for a high signal-to-noise (SNR) in would typically be higher than the correlation threshold for a low SNR image. Once the correlation peak has been identified, a parabolic or Gaussian interpolation may be used to compute sub-pixel displacement.

In block 110, the adaptive feature tracking software and/or circuitry in workstation 40 compensates for the determined displacement by actuating the SPM scanner to adjust the scan position 112 in the XY-plane for the next successive or third scan as a function of the determined vector displacement between the first and second scans 102 and 104. As a result, in the next frame, the feature 100' will be positioned in substantially the same area of the frame as compared to position of the feature 100 in the previous frame.

The SPM next captures the next successive or third scan 114, resulting in ("Frame 3"), from which the feature may again be tracked and displayed in real time. In the third scan 114, the modified feature 100' has displaced again to become a modified feature 100" due, for example, to the continually evolving/transitioning state of the sample and/or actuator thermal drift.

Next, in block 116, the adaptive feature tracking software and/or circuitry in the workstation 40 operates to determine a second displacement vector 118 characterizing the direction and magnitude of displacement between the modified feature 100' of Frame 2 and the additionally modified feature 100" of Frame 3. The vector 118 is determined from the position of the modified feature 100' from the second scan 104, using the adjusted position 112 and adaptively using the approximate center or another arbitrary but consistent location on the modified feature 100', to the position of the modified feature 100" in the third scan 114, also using the approximate center or other location of the modified feature 100".

In block 119, the adaptive feature tracking software and/or circuitry in workstation 40 operates to actuate the SPM scanner to adjust the scan position 120 for the next successive (fourth) scan as a function of the determined displacement of the feature between the second and third scans 104 and 114 according to the vector 118. As a result, in the next frame, the feature 100" will be positioned in substantially the same area of the frame as compared to position of the feature 100' in the previous frame as well as the position of 100 in the frame before that.

The SPM next captures a fourth successive scan 122, resulting in ("Frame 4"), from which the feature may again be tracked and displayed in real time. In the fourth scan 122, the modified feature 100" has displaced in that it has changed again in size, shape, and/or orientation to a modified feature 100''', adjusted position 120 notwithstanding, due, for example, to the continually evolving/transitioning state of the sample and/or actuator drift.

Next, in block 124, the adaptive feature tracking software and/or circuitry in the workstation 40 operates to determine a third displacement vector 126 characterizing the direction and magnitude of displacement between the modified feature 100" of Frame 3 and the modified feature 100''' of Frame 4. The vector 126 is determined by measuring the displacement of the modified feature 100" from the third scan 114, using the adjusted position 120 and adaptively using the approximate center or another consistent location of the modified feature 100", to the position of the modified feature 100''' in the fourth scan 122, also using the approximate center or other consistent location of the modified feature 100'''. Because the adaptive feature tracking software and/or circuitry uses an adaptive template for tracking, the correct modified feature 100''' is identified and a different, "wrong" feature 128 that would have been "tracked" using the prior art technique of FIG. 2 is successfully avoided.

In block 130, the adaptive feature tracking software and/or circuitry within workstation 40 operates to adjust the scan position 122 of the SPM scanner for the next successive scan as a function of the determined displacement of the feature between the third and fourth scans 114 and 122 according to the vector 126. As a result, in the next frame, the feature 100''' will be positioned in substantially the same area of the frame as compared to position of the feature 100" in the previous frame. In addition, the feature and region of interest continuously remain aligned in each successive scan relative to the previous scan. Since the ROI can now be kept in a field of view of a relatively small size with a higher level of confidence than otherwise would be possible, the scan area can be reduced, permitting the capture of the ROI faster and/or at higher resolution than otherwise would be possible.

Consequently, due to the adaptive feature tracking software and/or circuitry's ability to adapt to feature displacement due to, for example, changes in size, shape, orientation, and/or location, the modified feature 100 continues to stay in view in the scan position 122 in each successive frame.

This process continues in successive scans, now tracking the correct modified feature according to its updated size, shape, orientation, and/or location. In other words, in each "$N^{th}$" scan, the displacement vector (both direction and magnitude) is determined based on the feature template from the immediately preceding "$N^{th}-1^{st}$," as opposed to being determined based on a fixed feature template as in the prior art.

It should be noted that compensation is not strictly required in all applications of the adaptive tracking technique described herein. It also is not strictly required between each of the third through $N^{th}$ scans in any particular application, so long as confidence is high that the feature will remain within the frame and frame-to-frame alignment is not required for other purposes.

Figure 4:
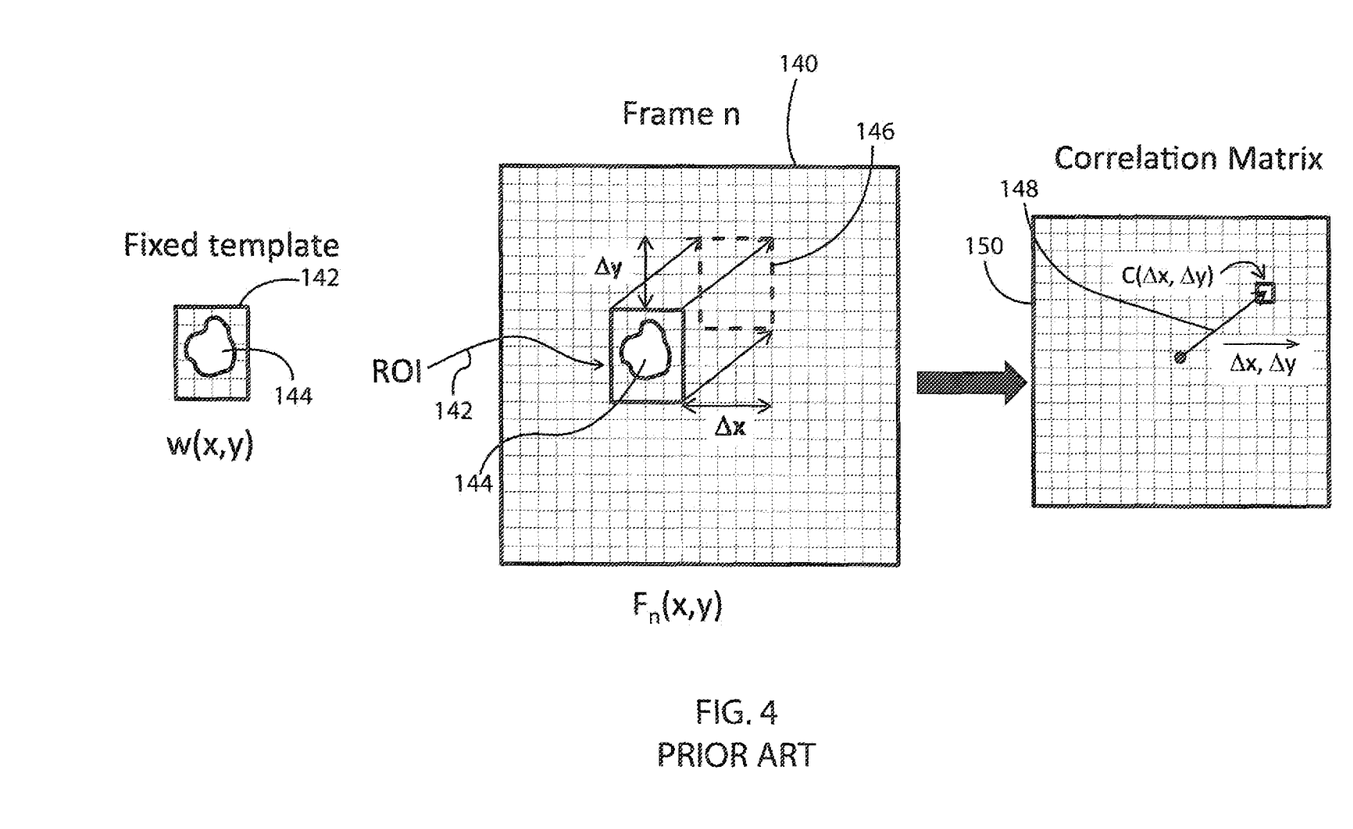
FIG. 4 schematically illustrates the prior art fixed template based tracking of a feature used in the process of FIG. 2, appropriately labeled "Prior Art"

Referring now to FIG. 4, a scan 140 ("Frame n") illustrating the prior art technique for fixed template-based tracking of a feature, using normalized cross-correlation to determine feature displacement, as described above with respect to FIG. 2, is shown. The fixed feature 144 is used to determine displacement for all successive frames of data. The scan 140 contains a region of interest ("ROI") 142 that is the identified location of the fixed feature 144 in the previous scan. The strength of the match of feature 144 at a displacement ($\Delta x$, $\Delta y$), represented by vector 148 in correlation matrix 150, is measured by the normalized correlation coefficient $C(\Delta x, \Delta y)$ in correlation matrix 150.

The vector corresponding to the peak value of the normalized correlation matrix 150 determines the new ROI displacement between Frame N and Frame N−1 Here, the fixed template normalized cross-correlation may be determined, for example, according to the equations:

$$C(\Delta x, \Delta y) = \sum_{\forall x, y \in XOI} ((w(x, y) - \overline{w}) * (F_n(x + \Delta x, y + \Delta y) - \overline{F}_n)) / \text{Norm}(\Delta x, \Delta y)$$

$$\text{Norm}(\Delta x, \Delta y) = \left( \sum_{\forall x, y \in POI} (w(x, y) - \overline{w})^2 * \sum \left( F_n_{\forall x, y \in ROI} (x + \Delta x, y + \Delta y) - \overline{F}_n \right)^2 \right)^{1/2}$$

Where Δx is the change in position or displacement of the ROI in the X-direction;

Δy is the change in position or displacement of the ROI in the Y-direction;

w(x, y) is the fixed feature template;

$\overline{w}$ is the average value of the elements of the template;

$F_n$ is the $N^{th}$ SPM scan;

$\overline{F}_n$ is the average value of $F_n$ in the area defined by the ROI 142 shifted by (Δx, Δy); and C(Δx, Δy) is the normalized cross correlation between w and $F_n$ at displacement (Δx, Δy).

Accordingly, fixed template normalized cross-correlation may be used for tracking in successive scans in relation to an initial scan or fixed feature definition. Additional information relating to the fixed template normalized cross-correlation equations may be found, for example, in *Digital Image Processing Using MatLab*, Rafael C. Gonzalez, Richard E. Woods, Steven L. Eddins, 2009, including at pages 312-313, the contents of which is hereby incorporated by reference in its entirety.

Figure 5:
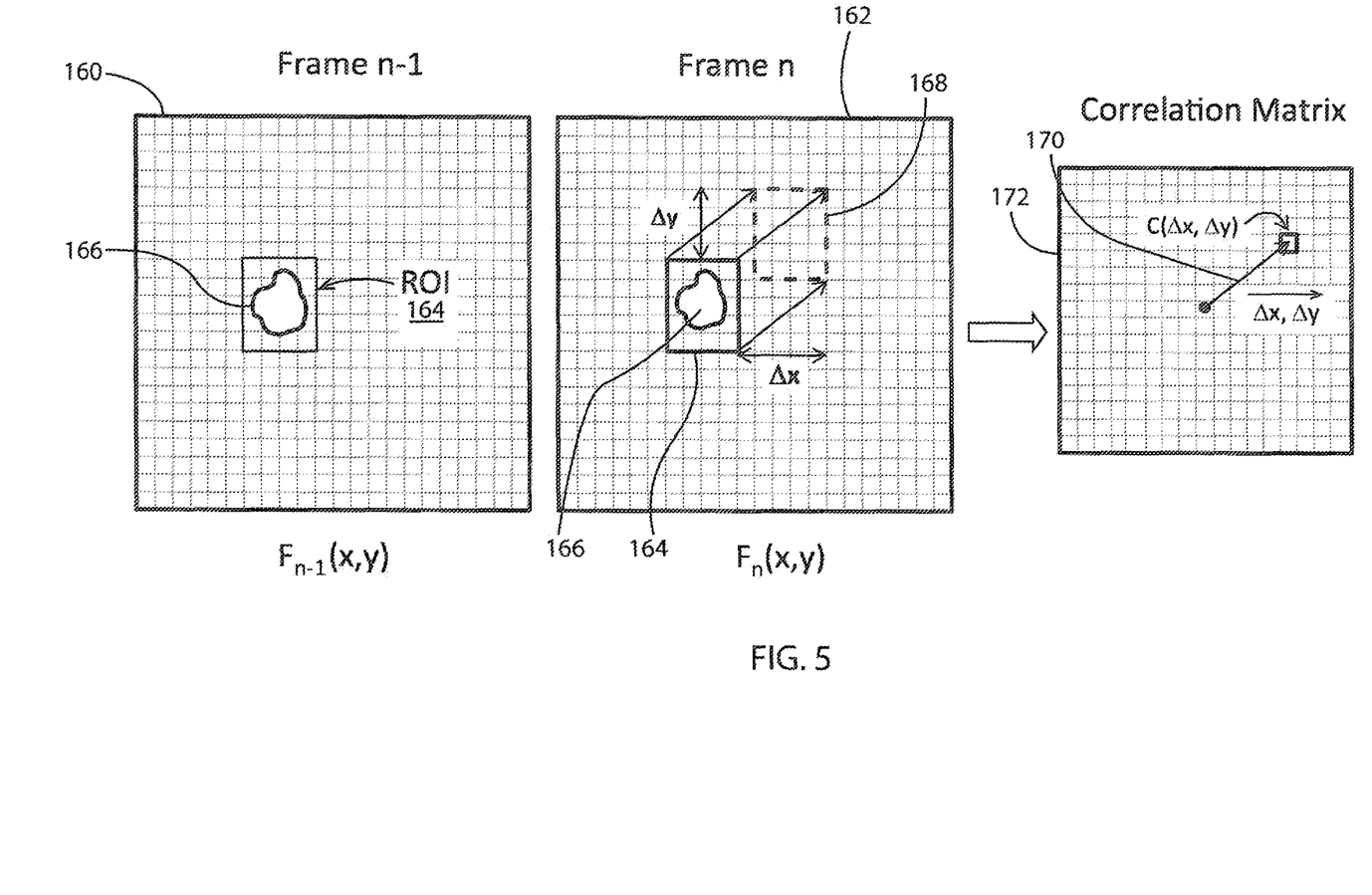
FIG. 5 schematically illustrates the technique for the adaptive tracking of a feature, used in the process of FIG. 3.

In contrast, referring now to FIG. 5, a first scan ("Frame n−1") 160 and a second scan ("Frame n") 162 illustrate an adaptive technique using an adaptive template for tracking a feature, as described above with respect to FIG. 3, is shown.

The first scan 160 contains a region of interest ("ROI") 164 that is an identified location in a previous scan. The ROI 164 contains a feature 166 of interest that conceptually corresponds to the feature 100 discussed above in connection with FIG. 3. The strength of the match of feature 166 at a displacement (Δx, Δy) is measured by the normalized correlation coefficient C(Δx, Δy) in correlation matrix 172. The vector corresponding to the peak value of the normalized correlation matrix 172 determines the new ROI displacement between Frame N and Frame N−1. For example if C(Δx, Δy) is the maximum value of the correlation matrix 172, then ROI 168 is the new determined location of modified feature 166 due, for example, to the evolving/transitioning state of the sample, movement of the sample, and/or feature on the sample, and/or drift of the actuator. In this case, a calculated vector 170 in correlation matrix characterizes the direction and magnitude of the change in position of the feature shown (and/or ROI 164). Here, the adaptive normalized cross-correlation may be determined, for example, according to the equations:

$$C(\Delta x, \Delta y) = \sum_{\forall x, y \in ROI} ((F_{n-1}(x, y) - \overline{F}_{n-1}) * (F_n(x + \Delta x, y + \Delta y) - \overline{F}_n)) / \text{Norm}(\Delta x, \Delta y)$$

$$\text{Norm}(\Delta x, \Delta y) = \left( \sum_{\forall x, y \in ROI} (F_{n-1}(x, y) - \overline{F}_{n-1})^2 * \sum_{\forall x, y \in ROI} (F_n(x + \Delta x, y + \Delta y) - \overline{F}_n)^2 \right)^{1/2}$$

Where Δx is displacement of the ROI in the X-direction between scans N−1 and N;

Δy is the displacement of the ROI in the Y-direction between scans N−1 and N;

$F_{n-1}(x, y)$ is the previous frame or scan;

$\overline{F}_{n-1}$ is the average value of the elements of $F_{n-1}$ in the current ROI;

$F_n$ is the $N^{th}$ SPM scan;

$\overline{F}_n$ is the average value of $F_n$ in the area defined by the ROI shifted by (Δx, Δy); and C(Δx, Δy) is the normalized cross correlation between $F_{n-1}$ and $F_n$ at the displacement (Δx, Δy).

The adaptive technique using a normalized cross-correlation based template for tracking, as described above with respect to FIGS. 3 and 5, also permits subpart-by-subpart tracking, processing, and/or displaying within each scan. A "subpart" in this regard may be a line of a raster scan or other defined portion of a larger scan, such as a designated number of scan lines. This subpart-by-subpart update provides, for example, drift correction of the feature, in addition to improving speed, processing, and display times.

Figure 6:
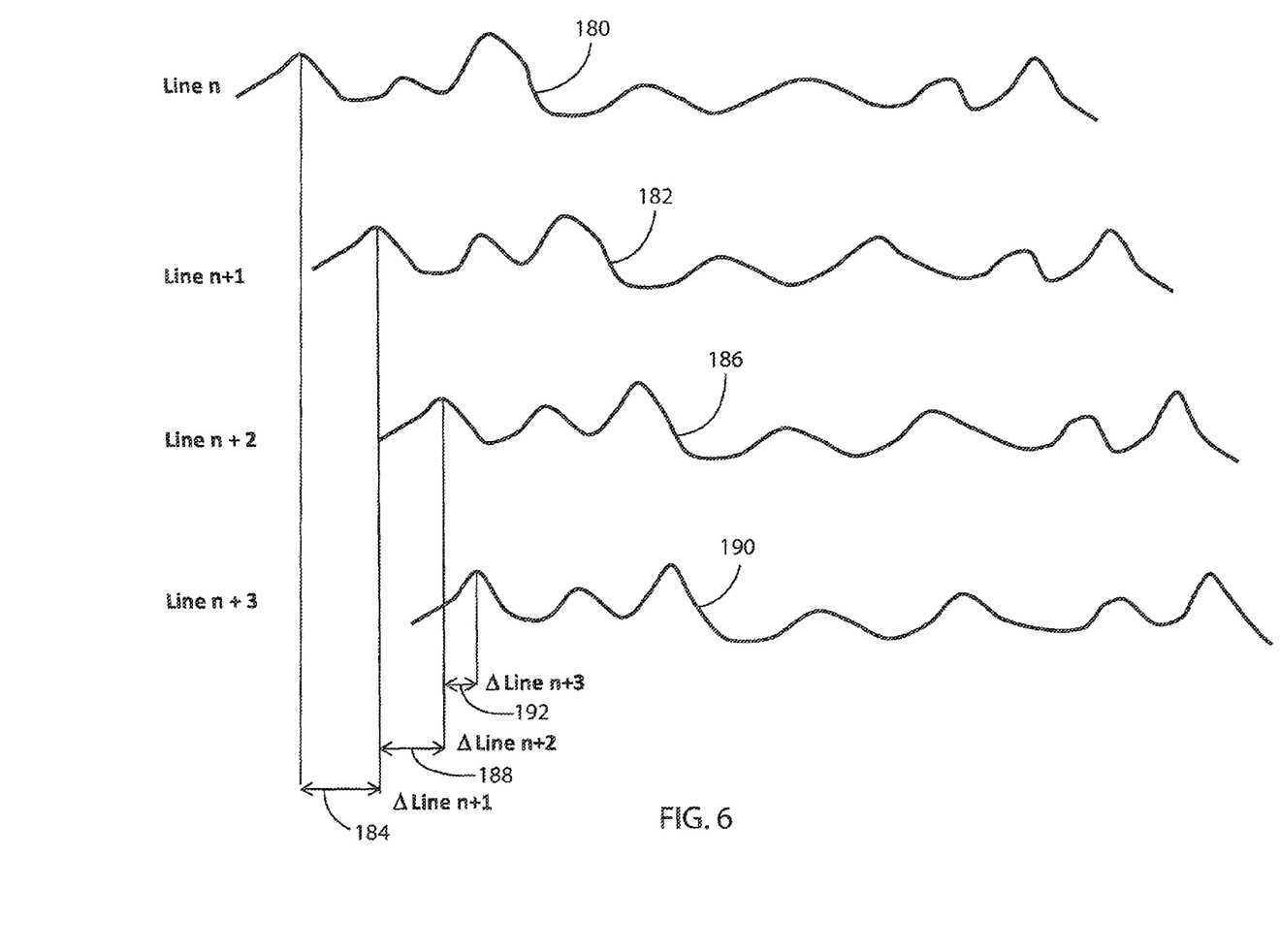
FIG. 6 is a graph illustrating adaptive line-by-line, or sub-part-by-subpart, tracking within a scan.

Referring now to FIG. 6, a graph is shown illustrating adaptive subpart-by-subpart updating within a particular scan in which the subpart is a line, it being understood that it could alternatively be another predefined part of a scan. A first line ("Line n") 180 of a scan is captured. A second line ("Line n+1") 182 of the scan is captured. A comparison between the first line 180 and the second line 182 reveals a displacement 184 of the line in the X direction. This displacement 184 may be calculated in real time as soon as the second line has been scanned. Consequently, a correction may be applied to the scan position for the next successive or third ("Line n+2") 186 even as that line is being scanned. In other words, as soon as a subpart of data is taken in a particular scan with respect to a feature (and/or ROI), that data may be processed in real time for immediate updating of the scan. The method of calculating the line-by-line or subpart-by-subpart displacement uses an evolving (adapting) template. In this example, the template is the last line, shifted by the previously calculated displacement. Accordingly, the remainder of the present scan may if desired, be bypassed in favor of an updated scan to further accelerate scanning and processing cycles.

Figure 7:
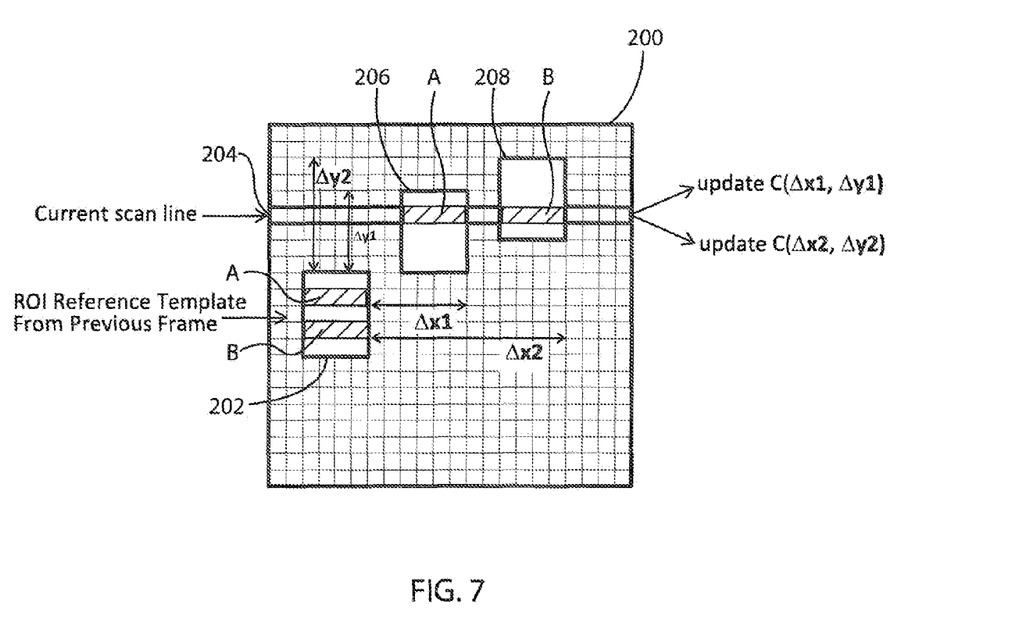
FIG. 7 schematically illustrates a scan using parallel line-by-line updating of the correlation matrix rows.

Referring now to FIG. 7, a scan 200 is shown illustrating parallel line-by-line correlation matrix updating. As each line is scanned, all correlation matrix coefficients which depend on that line are updated. In an embodiment, continuously running accumulators, for example, may be used to update correlation matrix coefficients. In other words, correlation matrix rows are progressively updated and can be analyzed as soon as each scan line is captured and processed. As shown in FIG. 7, a region of interest ("ROI") 202 from a previous scan includes exemplar rows "A" and "B." immediately upon scanning line 204, the normalized cross correlation C(Δx1, Δy1), corresponding to ROI 206 is updated with respect to row "A," Similarly, in the current scan line 204, the normalized cross correlation C(Δx2, Δy2) corresponding to ROI 208 is updated with respect to row "B."

Figure 8:
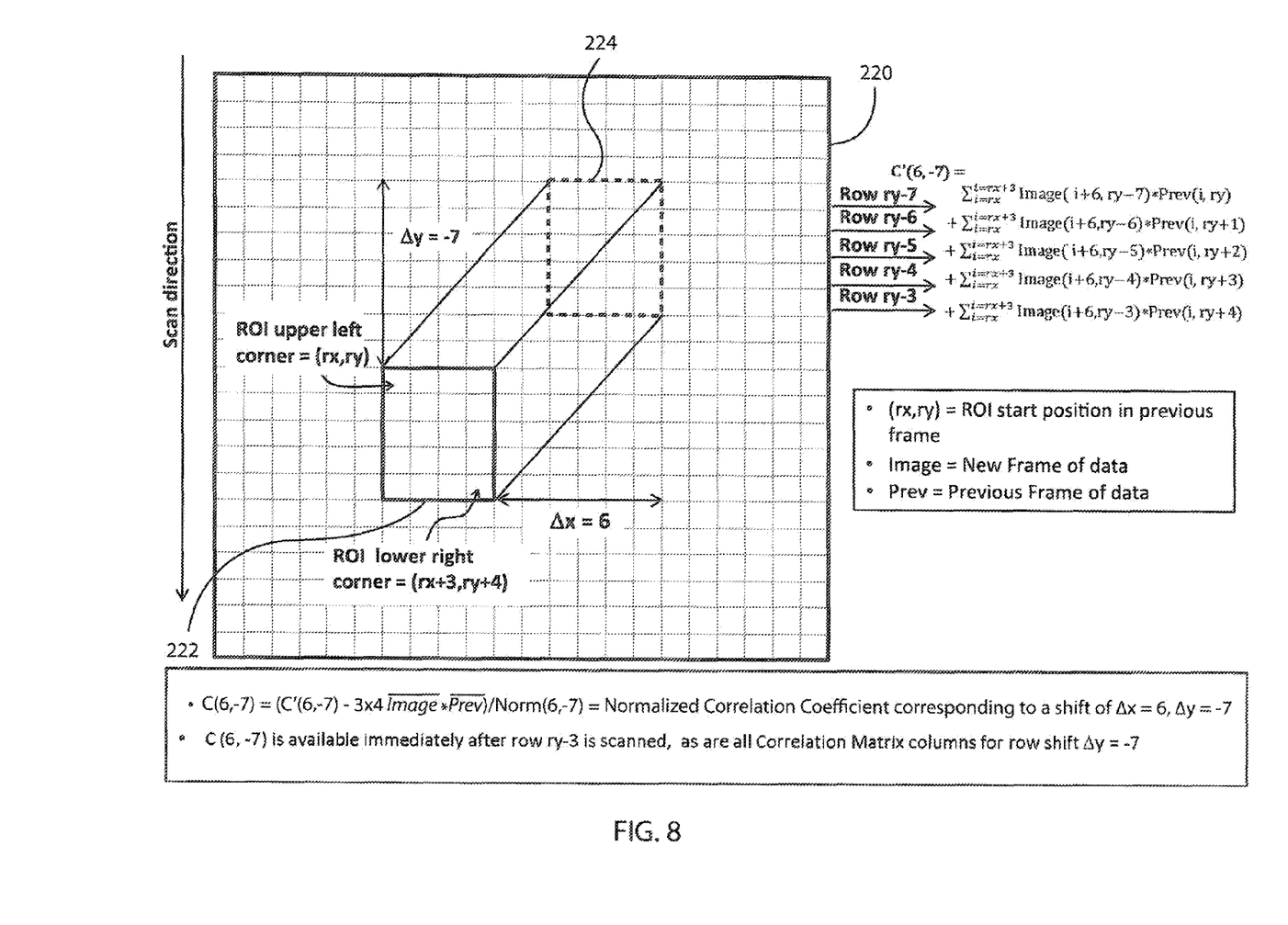
FIG. 8 is an example of the calculation of a single normalized cross-correlation coefficient using parallel line-by-line updating of the correlation matrix rows.

Referring now to FIG. 8, an example calculation of a single normalized correlation coefficient using parallel line-by-line correlation matrix updating is provided. A scan 220 contains a region of interest ("ROI") 222 with upper left corner coordinates (rx, ry) spanning five rows. A shifted ROI' 224, also spanning five rows, is repositioned 7 rows above and six columns to the right of ROI 222 in the next or $N^{th}+1^{st}$ scan. As each row, starting with Row ry+7 and ending with Row ry+3, is scanned the correlation coefficient C(6,−7) is updated, and therefore progressively refined. The normalized cross correlation coefficient corresponding to the shifted ROI 224 ("C(6, −7)") is characterized by the following equation:

$$C(6,-7) = (C'(6,-7) - (3 \times 4))\overline{\text{Image}} * \overline{\text{Prev}} / \text{Norm}(6,-7)$$

This may be shown on row-by-row basis as follows:

$$C'(6, -7) = \sum_{i=rx}^{i=rx+3} \text{Image}(i+6, ry-7) * \text{Prev}(i, ry)$$

-continued $$\sum_{i=rx}^{i=rx+3} \text{Image}(i+6, ry-6) * \text{Prev}(i, ry+1) \sum_{i=rx}^{i=rx+3} \text{Image}(i+6, ry-5) *$$

$$\text{Prev}(i, ry+2) \sum_{i=rx}^{i=rx+3} \text{Image}(i+6, ry-4) * \text{Prev}(i, ry+3)$$

$$\sum_{i=rx}^{i=rx+3} \text{Image}(i+6, ry-3) * \text{Prev}(i, ry+4)$$

In addition, the normalized cross correlation coefficient "C(6, −7)" is advantageously available immediately after the last row ry−3 of the shifted ROI' 224 is scanned.

Figure 9:
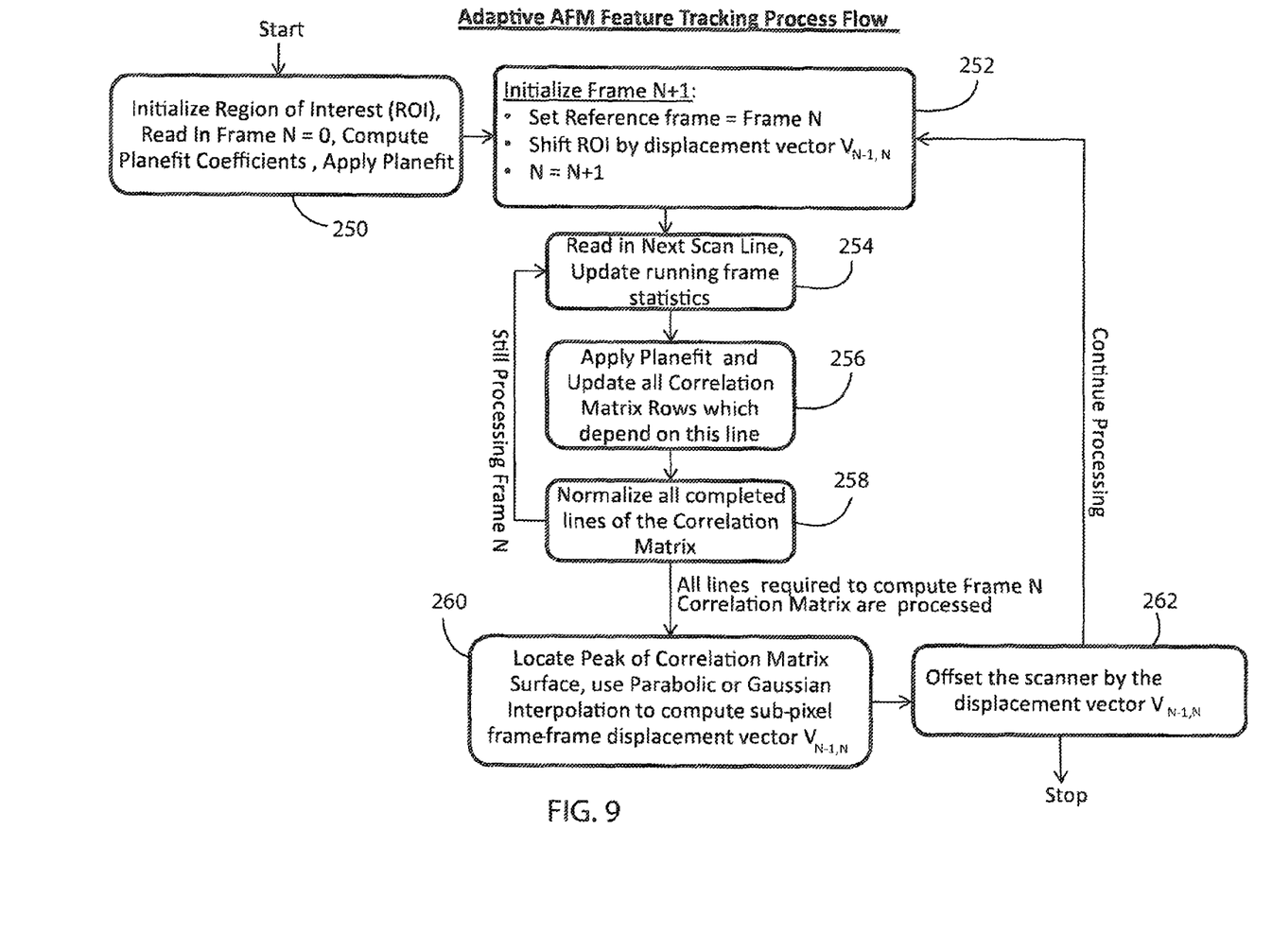
FIG. 9 is a flow chart of an adaptive technique for tracking a feature.

Referring now to FIG. 9, a flow chart for an adaptive feature tracking technique using normalized cross-correlation for tracking a feature in a region of interest is provided. Beginning at block 250, a first scan ("Frame N=0") is provided wherein a feature contained in region of interest ("ROI") may be selected, either by the operator and/or or by software and/or circuitry, for subsequent tracking and analysis. Next, in block 252, a next scan is initialized ("Frame N+1"). The ROI is shifted according to the displacement vector determined by the workstation 40 (FIG. 1) between the previous two scans ("$V_{N-1, N}$") and the adapted feature template from the shifted ROI in frame N is saved. The Frame reference (N) is updated to refer to the next frame.

Next, in block 254, a scan line (or other predefined subpart) is "imaged" by moving the scanner the length of the scanned area in X while the scanner is at a designated "Y" position and acquiring Z-dependent or other desired data at each position in X. Scan tracking statistics, such as the quadrant averages, are updated. Next, in block 256, all correlation matrix coefficients which depend on the scan line that was read in block 254 may be updated in real time according to, for example, the equations described with respect to FIG. 5. Next, in block 258, all completed rows of the correlation matrix are normalized using the workstation 40, and the process returns to block 254 to image the next scan line (or other subpart) until the scan lines are completed. Once the scan lines are completed with respect to a particular scan, the process continues to block 260 in which a scan-to-scan displacement vector ("$V_{N-1, N}$") is determined.

Next, in block 262, the scanner is displaced in the X- and/or Y-directions as a function of the determined vector to track the ROI. Next, the process may return to block 252 and thereby continue for successive scans until scanning is completed.

As mentioned briefly above, the adaptive tracking techniques described herein and other adaptive tracking techniques performed in accordance with the present invention could be performed off-line rather than on-line. That is, they could be performed after some or all scans are finished rather than being performed during or immediately after the scan. In this case, the adaptive tracking technique can be performed on the acquired data to facilitate digital image alignment, manipulation of common sample features across multiple scans, and/or understanding of physical processes occurring on the sample or associated with the AFM equipment. The calculations could be performed by the workstation 40 or by another programmed computer located onboard or off-board the SPM and receiving data from the SPM controller 20 either directly or indirectly.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

All of the publications described herein including patents and non-patent publications are hereby incorporated herein by reference in their entireties.

What is claimed is:

1. A method for adaptively tracking a sample feature scanned using a scanning probe microscope (SPM), comprising:
   A) using the SPM, capturing first, second and third scans of the sample feature; and
   B) using a programmed computer
      1) receiving data acquired as a result of the first, second, and third scans, and,
      2) using the received data,
         a) determining a vector displacement of the feature between the first and second scans, and
         b) determining a vector displacement of the feature between the second and third scans.

2. The method of claim 1, wherein each step is performed in real time.

3. The method of claim 2, wherein the third scan is offset relative to the second scan as a function of the determined vector displacement of the feature between the first and second scans.

4. The method of claim 3, further comprising, for each of a number N+1 scans performed after the third scan, where N is greater than 3, determining, using the programmed computer, a vector displacement of the feature between the two immediately preceding scans based on at least one SPM recognizable attribute of the feature appearing in the two immediately preceding scans.

5. The method of claim 4, wherein the vector displacement is determined for each successive scan between the third and the N+1$^{st}$ scans.

6. The method of claim 4, further comprising, prior to each of the N+1 scans in which a vector displacement is determined, offsetting the scan as a function of the determined vector displacement.

7. The method of claim 6, wherein the feature is contained on a defined region of interest (ROI) within the scanned area.

8. The method of claim 7, wherein, as a result of the offsetting step, the ROI, and hence the feature, are kept in substantially the same position within each successive scanned area.

9. The method of claim 2, wherein the programmed computer is on-board the SPM.

10. The method of claim 9, wherein the programmed computer is located one of onboard the SPM and off-board the SPM.

11. The method of claim 1, wherein the determining steps take place off-line after completion of the first, second, and third scans.

12. The method of claim 11, further comprising, for each of a number N+1 scans performed after the third scan, where N is greater than 3, determining, using the programmed computer, a vector displacement of the feature between the two immediately preceding scans based on at least one SPM recognizable attribute of the feature appearing in the two immediately preceding scans.

13. The method of claim 12, wherein the vector displacement is determined for each successive scan between the third and the N+1$^{st}$ scans.

14. A method for adaptively tracking a sample feature scanned using a scanning probe microscope (SPM), comprising:
 A) using the SPM, capturing a number N+1 scans of the sample feature, where N is greater than 3; and
 B) using a programmed computer,
  1) receiving data acquired as a result of each of the N+1 scans, and
  2) using the received data,
   a) defining a region of interest (ROI) within a scanned area that contains the feature, and,
   b) for at least some of the third to the N+1$^{st}$ scans, determining a vector displacement of the feature between the two immediately preceding scans based on at least one SPM recognizable attribute of the feature appearing in the two immediately preceding scans.

15. The method of claim 14, wherein each step is performed in real time.

16. The method of claim 15, further comprising, prior to each of the N+1 scans in which a vector displacement is determined, offsetting the scan as a function of the determined vector displacement.

17. The method of claim 14, wherein the determining steps take place off-line after completion of the N+1 scans.

18. The method of claim 14, wherein the ROI is defined with manual input to the programmed computer.

19. An apparatus for tracking a sample feature scanned using a scanning probe microscope (SPM), the SPM capturing first, second and third scans of the sample feature, the apparatus comprising:
a programmed computer that
 A) receives data acquired as a result of the first, second, and third scans, and
 B) using the received data,
  1) determines a vector displacement of the feature between the first and second scans, and
  2) determines a vector displacement of the feature between the second and third scans.

20. The apparatus of claim 19, wherein the programmed computer determines the vector displacements in real time.

21. The apparatus of claim 19, wherein the programmed computer controls the SPM to offset the third scan relative to the second scan as a function of the determined vector displacement of the feature between the first and second scans.

22. The apparatus of claim 21, wherein, prior to each of N+1 scans in which a vector displacement is determined, where N is greater than 3, the programmed computer controls the SPM to offset the scan as a function of the determined vector displacement.

23. The apparatus of claim 19, wherein the programmed computer determines the vector displacement off-line after completion of the first, second, and third scans.

* * * * *